United States Patent
Wintzer et al.

(10) Patent No.: US 9,719,647 B2
(45) Date of Patent: *Aug. 1, 2017

(54) VEHICLE HEADLIGHT COMPRISING A LIGHT TUNNEL, A BEND AND A LIGHT PASSAGE

(71) Applicant: DOCTER OPTICS SE, Neustadt an der Orla (DE)

(72) Inventors: Wolfram Wintzer, Jena (DE); Hans Scheibner, Neustadt (DE); Mohsen Mozaffari, Gera (DE)

(73) Assignee: Docter Optics SE, Neustadt an der Orla (DE)

( * ) Notice: Subject to any disclaimer, the term of this patent is extended or adjusted under 35 U.S.C. 154(b) by 203 days.

This patent is subject to a terminal disclaimer.

(21) Appl. No.: 14/652,706

(22) PCT Filed: Nov. 21, 2013

(86) PCT No.: PCT/EP2013/003514
§ 371 (c)(1),
(2) Date: Jun. 16, 2015

(87) PCT Pub. No.: WO2014/114309
PCT Pub. Date: Jul. 31, 2014

(65) Prior Publication Data
US 2015/0330590 A1    Nov. 19, 2015

(30) Foreign Application Priority Data
Jan. 23, 2013   (DE) ................ 10 2013 001 072

(51) Int. Cl.
*F21S 8/10*     (2006.01)
*G02B 19/00*   (2006.01)
*F21Y 115/10*  (2016.01)

(52) U.S. Cl.
CPC ......... *F21S 48/1275* (2013.01); *F21S 48/115* (2013.01); *F21S 48/1159* (2013.01);
(Continued)

(58) Field of Classification Search
CPC .. F21S 48/1241; F21S 48/115; F21S 48/1159; F21S 48/1275; F21S 48/2231;
(Continued)

(56) References Cited

U.S. PATENT DOCUMENTS 7,073,931 B2 * 7/2006 Ishida ................. F21S 48/1154
257/E33.059
8,207,705 B2 * 6/2012 Nagashima ............ H02J 7/027
180/65.21
8,944,649 B2 * 2/2015 Fedosik ............... F21S 48/1159
362/511

FOREIGN PATENT DOCUMENTS

DE         10252228      8/2003
DE       102008036192    2/2010
(Continued)

OTHER PUBLICATIONS

International Preliminary Report on Patentability, Application No. PCT/EP2013/003514, dated Jul. 28, 2015.
(Continued)

*Primary Examiner* — Robert May
(74) *Attorney, Agent, or Firm* — Barnes & Thornburg LLP (57) ABSTRACT

A vehicle headlamp comprising first second light sources and first and second lens. Each lens comprising a precision-molded, one-piece, element of a transparent material. Each one-piece element comprising a light tunnel and a light-conducting part having an optically effective light exit surface. The first lens light tunnel comprises an optically effective, light inlet surface and transitions into a light-conducting part while making a first bend for imaging the (Continued)

first bend as a light-shadow line by means of light coupled in or irradiated onto the light inlet surface. The second lens light tunnel comprises a second optically active, light inlet surface and transitions into a second light-conducting part while making a second bend for imaging the second bend by means of light coupled in or irradiated onto the light inlet surface, the second bend (substantially) being a variant of the first bend mirrored on a straight line.

20 Claims, 6 Drawing Sheets

(52) U.S. Cl.
 CPC ....... *F21S 48/1241* (2013.01); *F21S 48/1291* (2013.01); *F21S 48/1747* (2013.01); *G02B 19/0061* (2013.01); *G02B 19/0066* (2013.01); *F21Y 2115/10* (2016.08)

(58) Field of Classification Search
 CPC .. F21S 48/225; F21S 48/2256; F21S 48/2275; F21S 48/2281; G02B 19/0066; G02B 19/0061

See application file for complete search history.

(56) References Cited

FOREIGN PATENT DOCUMENTS

| | | |
|---|---|---|
| DE | 102011077636 | 11/2011 |
| DE | 102011118270 | 6/2012 |
| DE | 102011118271 | 6/2012 |
| DE | 102011118274 | 7/2012 |
| EP | 1903274 | 3/2008 |
| FR | 2944578 | 10/2010 |

OTHER PUBLICATIONS

English translation of International Preliminary Report on Patentability, Application No. PCT/EP2013/003514, dated Jul. 28, 2015.
International Search Report and Written Opinion, Application No. PCT/EP2013003514, dated Jul. 7, 2014.

* cited by examiner

VEHICLE HEADLIGHT COMPRISING A LIGHT TUNNEL, A BEND AND A LIGHT PASSAGE

CROSS REFERENCE TO RELATED APPLICATIONS

This application is a U.S. nationalization under 35 U.S.C. §371 of International Application No. PCT/EP2013/003514, filed Nov. 21, 2013, which claims priority to German Application No. 102013001072.1, filed Jan. 23, 2013.

FIELD OF THE INVENTION

The invention relates to a vehicle headlight, for example a motor vehicle headlight, including a headlight lens, which incorporates a monolithic body of transparent material including at least one light entry face and at least one optically effective light exit face.

BACKGROUND INFORMATION

WO 2012/072 188 A1 discloses a headlight lens for a motor vehicle headlight, wherein the headlight lens includes a body of transparent material incorporating at least one (for example optically effective) light entry face and at least one optically effective light exit face, and wherein the body comprises a light tunnel forming, via a bend, transition into a light passage section for imaging the bend as a bright-dark boundary.

SUMMARY

According to an aspect of the invention a vehicle headlight, e.g. a motor vehicle headlight, includes a first light source, at least one second light source, a first headlight lens and at least one second headlight lens, wherein the first headlight lens comprises a first, for example press-molded, for example monolithic body of transparent material, wherein the first, for example monolithic body comprises at least one first light tunnel and one first light passage section including at least one first optically effective light exit face, wherein the first light tunnel comprises at least one first, for example optically effective light entry face and, via a first bend, forms transition into the light passage section for imaging the first bend as a bright-dark boundary by means of light made to enter or irradiated, respectively, from the first light source into the first light entry face, wherein the second headlight lens comprises a second, for example press-molded, for example monolithic body of transparent material, wherein the second, for example monolithic body comprises at least one second light tunnel and one second light passage section including at least one second optically effective light exit face, wherein the second light tunnel comprises at least one second, for example optically effective light entry face and, via a second bend, forms transition into the light passage section for imaging the second bend (as a bright-dark boundary) by means of light from the second light source made to enter or irradiated, respectively, into the second light entry face, and wherein the second bend is (essentially) configured as a variant of the first bend reproduced as a mirror image, for example, at a straight (line), wherein it can be provided for that the first light passage section and the second light passage section are part of a mutual, for example press-molded, for example monolithic body.

According to another aspect of the invention a vehicle headlight, e.g. a motor vehicle headlight, includes a first light source, at least one second light source, and a headlight lens, wherein the headlight lens comprises a for example press-molded, for example monolithic body of transparent material, wherein the for example monolithic body comprises at least one first light tunnel and one light passage section including a first optically effective light exit face and at least one second optically effective light exit face, wherein the first light tunnel comprises at least one first, for example optically effective light entry face and, via a first bend, forms transition into the light passage section for imaging the first bend as a bright-dark boundary by means of light from the first light source made to enter or irradiated, respectively, into the first light entry face, wherein the for example monolithic body comprises at least one second light tunnel, wherein the second light tunnel comprises at least one second, for example optically effective light entry face and, via a second bend, forms transition into the light passage section for imaging the second bend (as a bright-dark boundary) by means of light from the second light source made to enter or irradiated, respectively, into the second light entry face, and wherein the second bend is (essentially) configured as a variant of the first bend reproduced as a mirror image, for example, at a straight (line).

An optically effective (operative) light entry (sur-)face and/or an optically effective light exit (sur-)face, respectively, is an optically effective surface of the monolithic body. In the sense of the invention, an optically operative (sur-)face is, in particular, a surface of the transparent body, at which surface, when using the headlight lens according to its purpose, light will be refracted. In the sense of the invention, an optically effective surface is, in particular, a surface at which, when using the headlight lens according to its purpose, the direction of light which passes through this surface will be changed.

In the sense of the invention, transparent material is in particular glass. Transparent material, in the sense of the invention, is particularly inorganic glass. In the sense of the invention, transparent material is particularly silicate glass. In the sense of the invention, transparent material is for example glass as described in PCT/EP2008/010136. Glass, in the sense of the invention, for example comprises 0.2 to 2% by weight $Al_2O_3$,
0.1 to 1% by weight $Li_2O$,
0.3, in particular 0.4 to 1.5% by weight $Sb_2O_3$,
60 to 75% by weight $SiO_2$,
3 to 12% by weight $Na_2O$,
3 to 12% by weight $K_2O$, and
3 to 12% by weight CaO.

In the sense of the invention, the term press-molding is, in particular, to be understood in a manner that an optically effective surface is to be (injection) molded under pressure such that any subsequent finishing or post-treatment of the contour of this optically effective face may be dispensed with or does not apply or will not have to be provided for, respectively. Consequently, it is particularly provided for that, after press-molding, the press-molded surface is not ground, (i.e. it will not [have to] be treated by grinding).

In the sense of the invention, a light tunnel is, in particular, characterized in that essentially total reflection takes place at its lateral (for example at the top, at the bottom, on the right and/or on the left) surfaces, so that light, entering through the light entry face is conducted through the tunnel acting as a light guide (conductor). In the sense of the invention, a light tunnel is in particular a light guide or light conductor. In particular, it is provided for that total reflection occurs at the longitudinal surfaces of the light tunnel. In particular, it is provided for that the longitudinal surfaces of the light tunnel are intended for total reflection. For example, it is provided for that total reflection is achieved on the surfaces of the light tunnel essentially orientated in the direction of the optical axis of the light tunnel. For example, it is provided for that the surfaces of the light tunnel essentially orientated in the direction of the optical axis of the light tunnel are destined for total reflection.

A bend, in the sense of the invention, is, in particular, a curved transition. A bend, in the sense of the invention, is, in particular, a curved transition having a radius of curvature of no less than 50 nm. In particular, it is provided for that the surface of the headlight lens involves no break or discontinuity in the bend, but rather a curve or curvature. In particular, it is provided for that the surface of the headlight lens in the bend has a curvature, in particular, including a radius of curvature of the curve in the bend of no less than 50 nm. In an embodiment the radius of curvature is no larger than 5 mm. In an expedient embodiment, the radius of curvature is no more than 0.25 mm, for example no more than 0.15 mm, for example no more than 0.1 mm. In a further embodiment of the invention, the radius of curvature of the curve in the bend is at least 0.05 mm. For example, it is provided for that the surface of the headlight lens is press-molded in the region of the bend.

The aforementioned straight (line) extends, for example, (essentially) in parallel to the optical axis of the first light tunnel and/or (essentially in parallel) to the optical axis of the second light tunnel.

The vehicle headlight is, for example, configured such that light which is made to enter the second headlight lens or the second light tunnel, respectively, through the second light entry face is directed onto an area above the bright-dark boundary. Herein, it is, for example, provided for that the second bend is also imaged as a bright-dark boundary, wherein the bright-dark boundary generated by means of the first bend and the bright-dark boundary generated by the second bend essentially lie on top of each other. It is, for example, provided for that the vehicle headlight is a combined high-beam-low-beam headlight. Herein, it is for example provided for that, in order to generate the low-beam headlight, the first light source is switched on and that, in order to generate the high-beam headlight, the first light source and the second light source are switched on.

In a further embodiment of the invention, the first light tunnel and/or the second light tunnel, respectively, is/are arranged between the first and/or the second bend, respectively, and the first and/or the second light entry face/s, respectively. In a further embodiment of the invention, the first and/or second light passage section/s, respectively, is/are arranged between the first and/or second bend/s, respectively, and the first and/or second light exit face/s, respectively. It is, for example, provided for that light entering the first and/or second transparent body/ies, respectively, through the first and/or second light entry face/s, respectively, and entering the first and/or second light passage section/s, respectively, from the first and/or second light tunnel/s, respectively, in the region of the first and/or second bend/s, respectively, will exit from the first and/or second light exit face/s, respectively, at an angle of between −30° and 30° with respect to the optical axis. It is, for example, provided for that light entering the first and/or second transparent body/ies, respectively, through the first and/or second light entry face/s, respectively, will exit from the first and/or second light exit face/s, respectively, at an angle of between −30° and 30° with respect to the optical axis. It is, for example, provided for that light entering the first and/or second transparent body/ies, respectively, through the first and/or second light entry face/s, respectively, and, from first and/or second the light tunnel/s, respectively, entering the first and/or second passage section/s, respectively, in the area/s of the first and/or second bend/s, respectively, will exit from the first and/or second light exit face/s, respectively, essentially in parallel to the optical axis. It is, for example, provided for that light entering the first and/or second transparent body/ies, respectively, through the first and/or second light entry face/s, respectively, will exit from the first and/or second light exit face/s, respectively, essentially in parallel to the optical axis.

In a further embodiment of the invention, the first and/or second bend/s, respectively, include/s an opening angle of at least 90°. In a father expedient embodiment of the invention, the first and/or second bend/s, respectively, include/s an opening angle of no more than 150°. In a further favourable embodiment of the invention, the first and/or second bend/s, respectively, is/are arranged on a surface of the first and/or second light passage section/s, respectively, which surface is facing the first and/or second light entry face/s, respectively.

In a further embodiment of the invention, the orthogonal/s of the first and/or second light entry face/s, respectively, is/are inclined with respect to the optical axis/es of the first and/or second light passage section/s, respectively. In a further expedient embodiment of the invention, the first and/or second light entry face/s, respectively, is/are inclined, with respect to the optical axis of the first and/or second light passage section/s, respectively, by an angle of between 5° and 70°, for example by an angle of between 20° and 50°, for example by an angle of approximately 45°.

In a further expedient embodiment of the invention the first and/or second light source/s, respectively, comprise/s at least one LED or an array of LEDs. In an expedient embodiment of the invention, the first and/or second light source/s, respectively, comprise/s at least one OLED or an array of OLEDs. For example, the light source may be a planar luminous field as well. The light source may also comprise light element chips as have been disclosed in DE 103 15 131 A1. A light source may as well be a laser. A suitable laser is disclosed in ISAL 2011 Proceedings, pages 271ff.

In a further expedient embodiment of the invention the vehicle headlight has no secondary optic associated with the headlight lens. A secondary optic, in the sense of the invention, is, for example, an optic means for aligning light which exits from the light exit face or from the last light exit face of the headlight lens, respectively. A secondary optic, in the sense of the invention, is, for example, an optical element for aligning light, said optical element being separated from and/or subordinated with regard to the headlight lens. A secondary optic, in the sense of the invention, is, for example, no cover or protection disc, respectively, but an optical element provided for aligning light. An example of a secondary optic is e.g. a secondary lens as disclosed in DE 10 2004 043 706 A1.

For example, it is provided for that the first bend which is imaged as a bright-dark boundary lies in the lower region of the first light tunnel. For example, it is provided for that the second bend lies in the upper region of the second light tunnel.

One or several further light sources may be provided for, whose light is made to enter or irradiated into, respectively, the first and/or second light passage section, respectively, and/or a part of the first and/or second light tunnel, respectively, for implementing sign light and/or cornering light.

When making such additional light enter the light tunnel, it is, for example, provided for that this occurs in that half of the first and/or second light tunnel, respectively, which is closer to the first and/or second light passage section and/or in which the first and/or second light entry face is not arranged. For example, additional light source arrays may be provided for as are described and/or claimed, respectively, in WO 2012/072192 A1. For example, additional light source arrays are specified in FIGS. 10, 14, 15, 18, 19, 20, and 21 of WO 2012/072192 A1. For example, the headlight lens according to the invention may be used in arrays having optical axes inclined with respect to each other, as is disclosed (and/or claimed, respectively), for example, in WO 2012/072193 A2, for example in FIG. 24 of WO 2012/072193 A2.

In a further embodiment of the invention the first and/or second light source/s, respectively, and the first and/or second light entry face/s, respectively, are configured and arranged with respect to each other such that light from the light source enters the first and/or second light entry face/s, respectively, at a luminous flux density of at least 75 $lm/mm^2$.

It can be provided for that a light entry face, in the sense of the invention, and/or a light exit face, in the sense of the invention, has/have a light dispersing structure. A light dispersing structure, in the sense of the invention, may, for example, be a structure as is disclosed in DE 10 2005 009 556 A1 and in EP 1 514 148 A1 or in EP 1 514 148 B1, respectively. It can be provided for that a light tunnel, in the sense of the invention, is coated. It can be provided for that a light tunnel, in the sense of the invention, is coated with a reflecting coating. It can be provided for that a mirroring coating is applied to a light tunnel in the sense of the invention.

In the sense of the invention, a motor vehicle is, in particular, a land vehicle for individual use in road traffic. In the sense of the invention, motor vehicles are, in particular, not restricted to land vehicles including a combustion engine.

The invention may contribute reducing the costs for manufacturing vehicle headlights.

DETAILED DESCRIPTION

Figure 1:
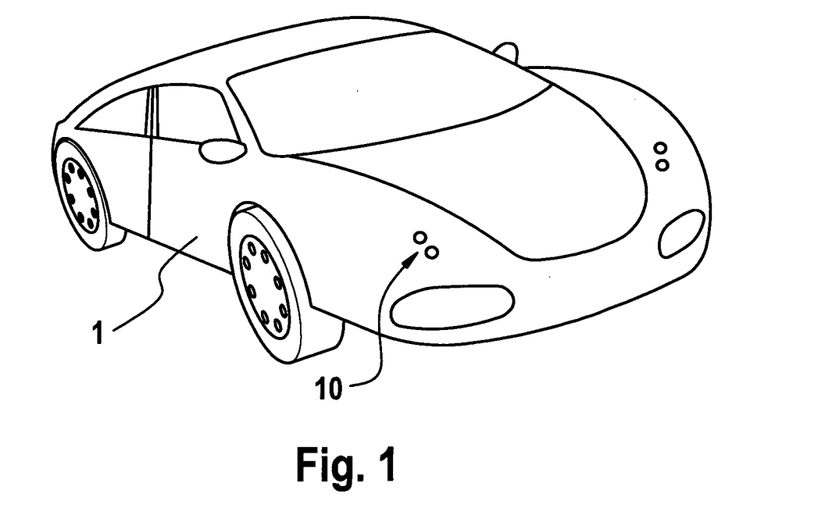
FIG. 1 shows an example of an embodiment of a motor vehicle.
Figure 2:
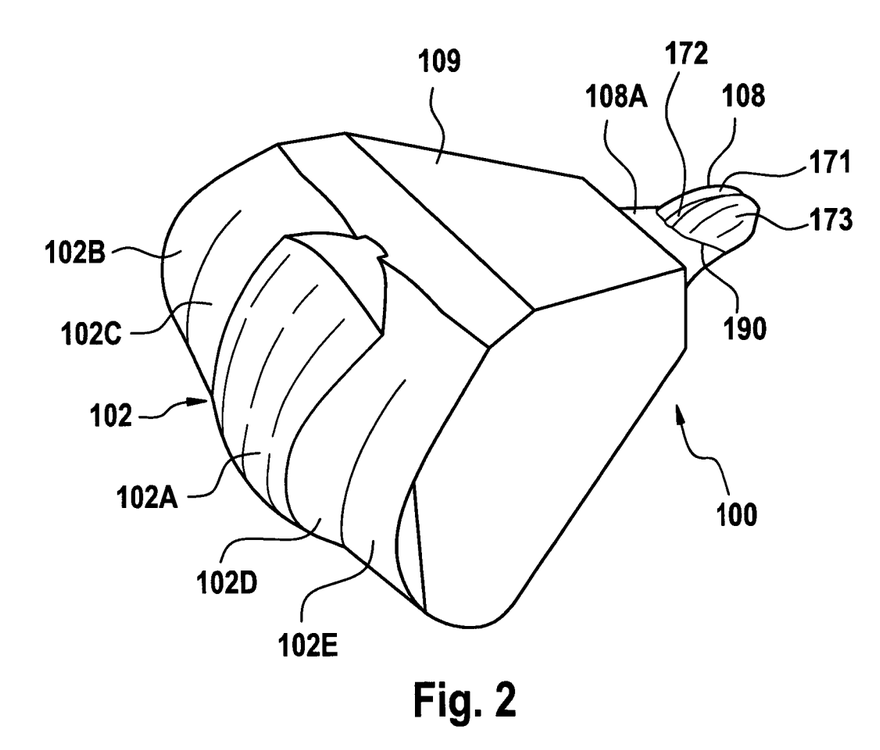
FIG. 2 shows an example of embodiment of a headlight lens for implementation in the motor vehicle according to FIG. 1.
Figure 3:
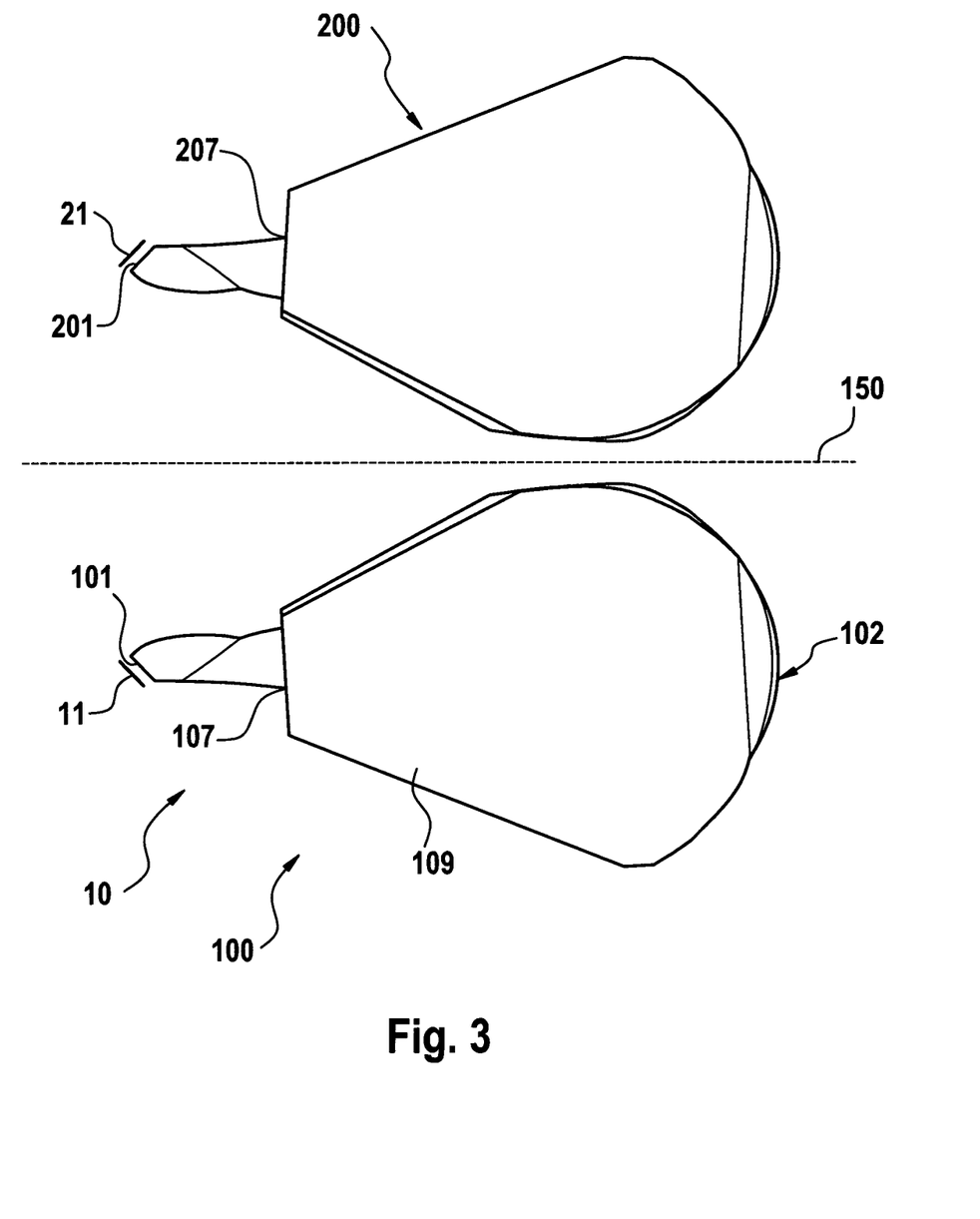
FIG. 3 shows an example of embodiment of a motor vehicle headlight lens for implementation in the motor vehicle according to FIG. 1, by way of a side view.

FIG. 1 shows an example of embodiment of a motor vehicle 1 including a motor vehicle headlight 10. FIG. 3 shows the motor vehicle headlight 10 by way of a side view, including a headlight lens 100 and a headlight lens 200, but without any housing, fittings and energy supply means, with the headlight lens 100 shown in FIG. 2 by way of an inclined top view, however, also without any housing, fittings and energy supply means. The headlight lens 100 comprises a press-molded monolithic body made from inorganic glass, for example glass comprising 0.2 to 2% by weight $Al_2O_3$,
0.1 to 1% by weight $Li_2O$,
0.3, for example 0.4, to 1.5% by weight $Sb_2O_3$,
60 to 75% by weight $SiO_2$,
3 to 12% by weight $Na_2O$,
3 to 12% by weight $K_2O$, and
3 to 12% by weight CaO.

Figure 5:
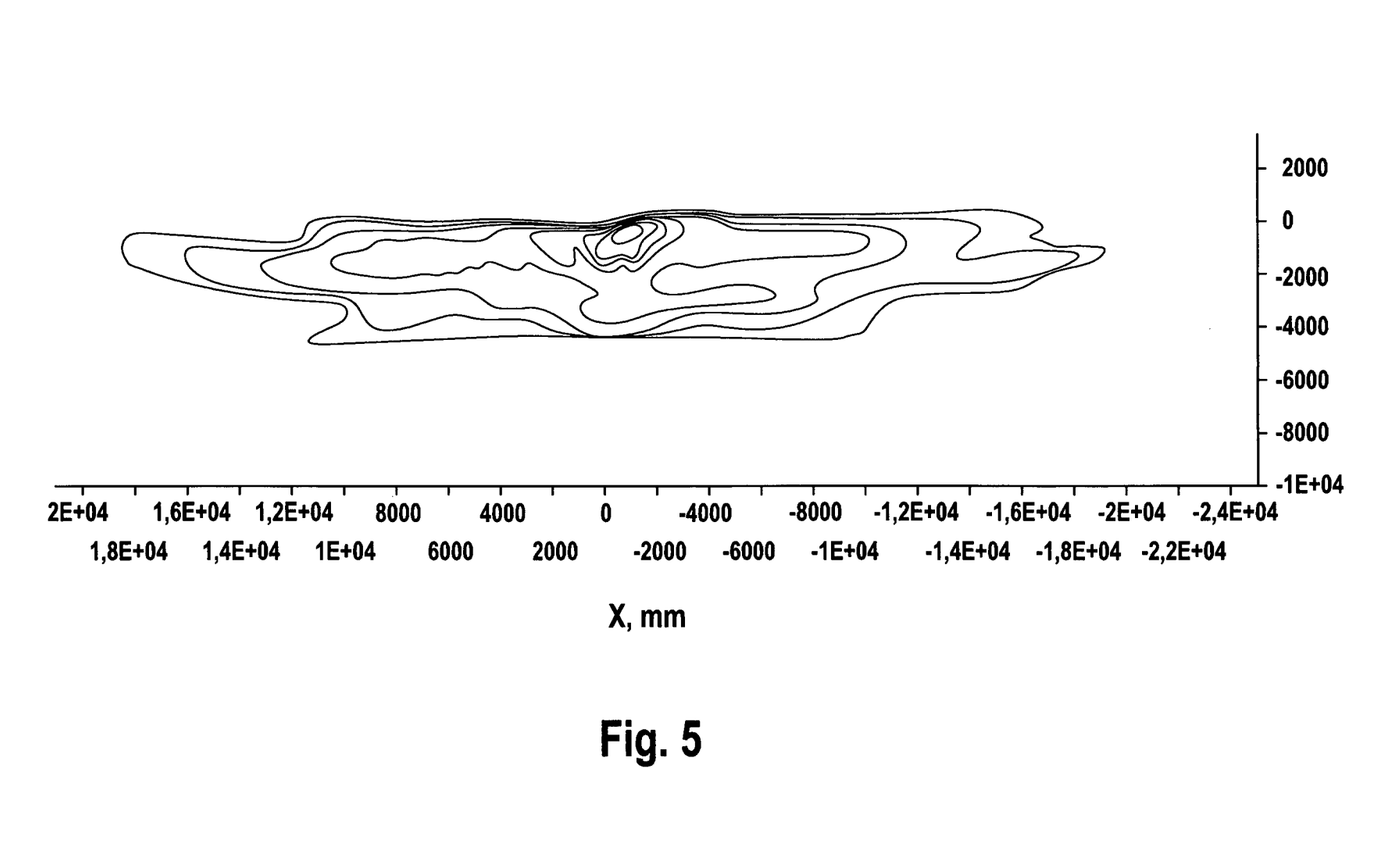
FIG. 5 shows a bright-dark boundary generated by means of the motor vehicle headlight lens according to FIG. 3.

The press-molded monolithic body comprises a light tunnel 108, which, on its one side, includes a light entry face 101 and, on another side, forms transition into a light passage section 109 (of the bright- or press-molded monolithic body) via a bend 107, which section 109 has a segmented light exit face 102, whose segments are designated by reference numerals 102A, 102B, 102C, 102D, and 102E. The headlight lens 100 is configured such that light entering the headlight lens 100 through the light entry face 101 and, in the region of the bend 107, entering the light passage section from the light tunnel 108, will exit from the light exit face 102 essentially in parallel to the optical axis of the headlight lens 100. Herein, the light passage section 109 images the bend 107 as a bright-dark boundary, as has been represented in FIG. 5, wherein, for implementing low-beam headlight, by means of the light source 11, configured as an LED, light is irradiated into or made to enter, respectively, the light entry face 101 of the light tunnel 108.

Figure 4:
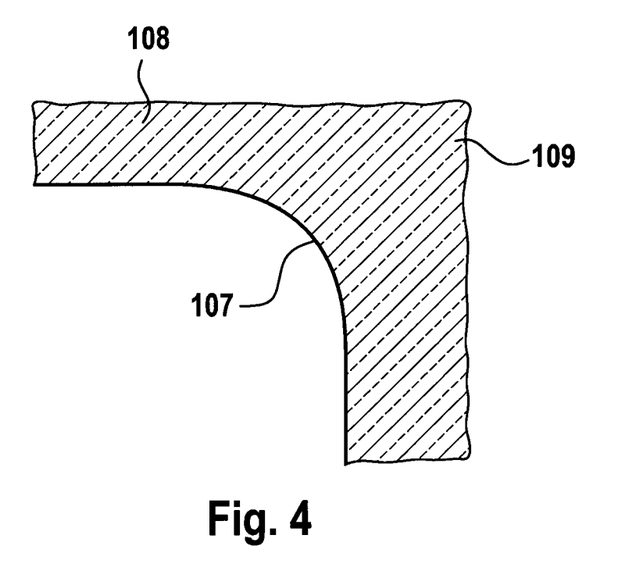
FIG. 4 shows an enlarged representation of a cut-out cross section of a bend for the transition of a light tunnel into a light passage section of a headlight lens according to FIG. 2.

FIG. 4 shows an enlarged representation of a cut-out of the bend 107 for the transition of the light tunnel 108 into the light passage section 109. The bend 107 is molded by bright-molding and configured as a continuously curved transition.

The light tunnel 108 has a transition region 108A, in which the surface restricting the light tunnel upwardly rises in the direction towards the light passage section 109, and in which (transition region 108 A) the surface restricting the light tunnel 108 downwardly extents approximately horizontally or in parallel, respectively, with respect to the optical axis of the headlight lens 100. In its rearward area, the light tunnel 108 includes two longitudinal indentations on its upwardly restricting surface, which longitudinal indentations extend essentially in the longitudinal direction of the light tunnel 108, or essentially in parallel to the optical axis of the light tunnel 108, or essentially in parallel to the optical axis of the light passage section 109, or essentially in parallel to the optical axis of the light exit face 102, respectively. In this portion, the light tunnel 108 comprises three segments 171, 172, and 173, orientated in the longitudinal direction of the tunnel and termed longitudinal segments in the following, which are configured, or separated, respectively, by the longitudinal indentations. The longitudinal segments 171, 172, and 173 of the light tunnel 108 start at the light entry face 101 and extend up to the transversal indentation 190. The longitudinal segments 171, 172, and 173 comprise, on their upper sides, a surface, which essentially corresponds to a part of the surface of an ellipsoid.

Figure 6:
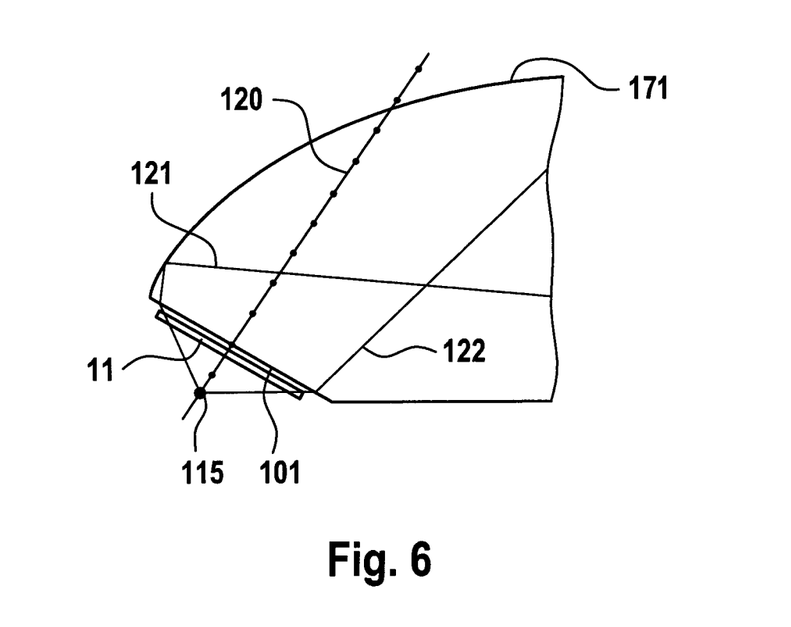
FIG. 6 shows an enlarged cut-out representation of the light tunnel of the headlight lens according to FIG. 3, by way of a side view.

FIG. 6 shows an enlarged cut-out representation of a part of the longitudinal segment 171. The upper portion of the part of the longitudinal segment 171 of the light tunnel 108 represented in FIG. 6 is configured as an ellipsoid. The light beams 121 and 122 depicted in FIG. 6 illustrate the course of the beams of light from the light source 11, which light is irradiated into or made to enter, respectively, the light entry face 101. Reference numeral 120 of FIG. 6 designates the orthogonal of the light entry face 101. Reference numeral 115 designates the mutual point of intersection of the orthogonal 120 of the light entry face 101 with the light beams 121 and 122.

Figure 7:
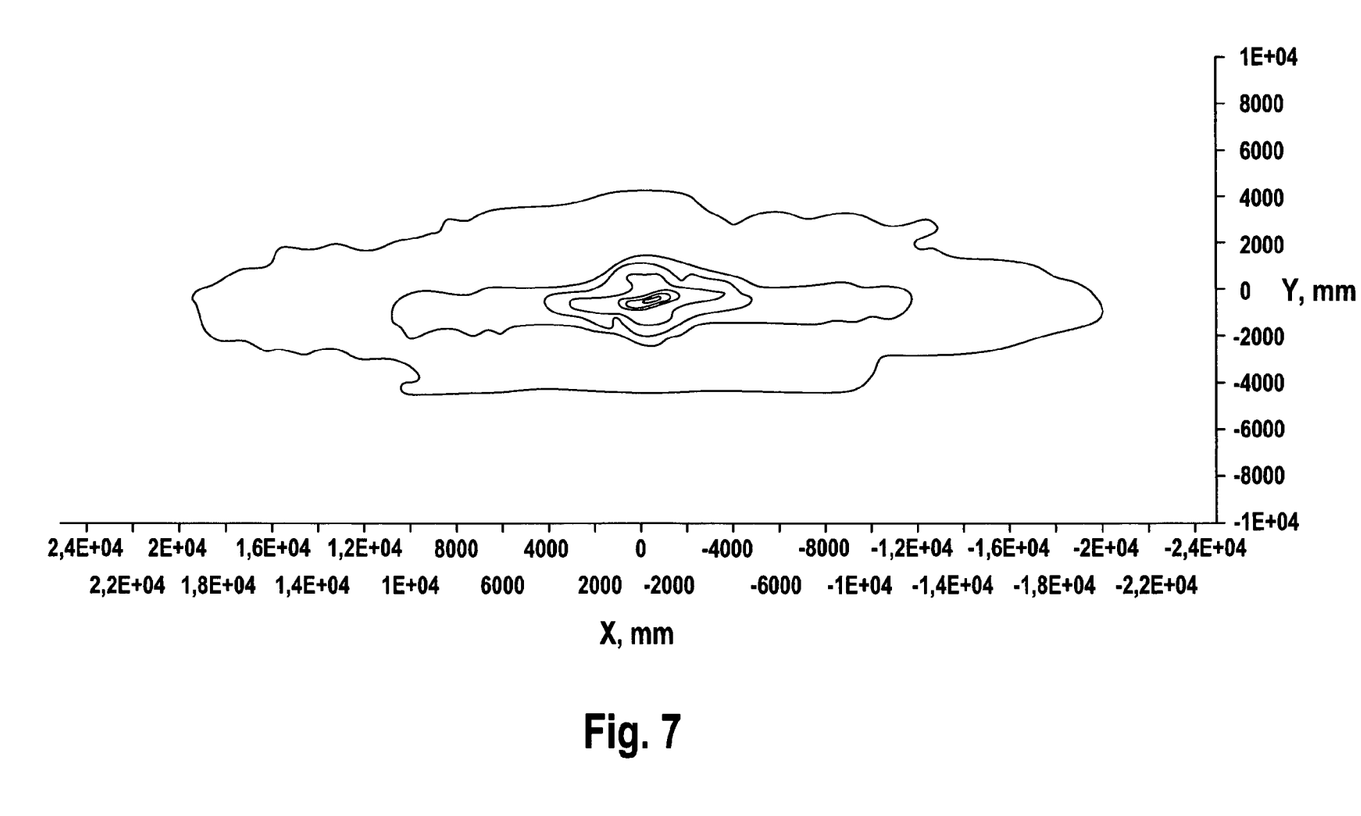
FIG. 7 shows an example of embodiment of an illumination pattern when using the headlight lens according to FIG. 3 in a high beam mode.

The headlight lens 200 is, essentially, constructed or configured, respectively, analogous to the headlight lens 100. However, the headlight 100 is—as represented in FIG. 3—a version of the headlight lens 100 which has been reproduced as a mirror image at an imaginary straight (line) 150. Correspondingly, the headlight lens 200 includes a bend 207 which is a version of the bend 107 reproduced as a mirror image at the straight 150. The motor vehicle headlight 10, moreover, includes a further light source 21, by means of which light is made to enter or irradiated into, respectively a light entry face 201 of the headlight lens 200. The motor vehicle headlight 10 is a combined headlamp for low-beam headlight and high beam (long distance or driving) light, wherein low-beam headlight is generated by the light source 11 (alone) being switched on. For implementing high beam light, the light source 11 as well as the light source 21 are switched on, so that an illumination pattern results (25 m in front of the motor vehicle headlight 10), as is represented in FIG. 7.

Figure 8:
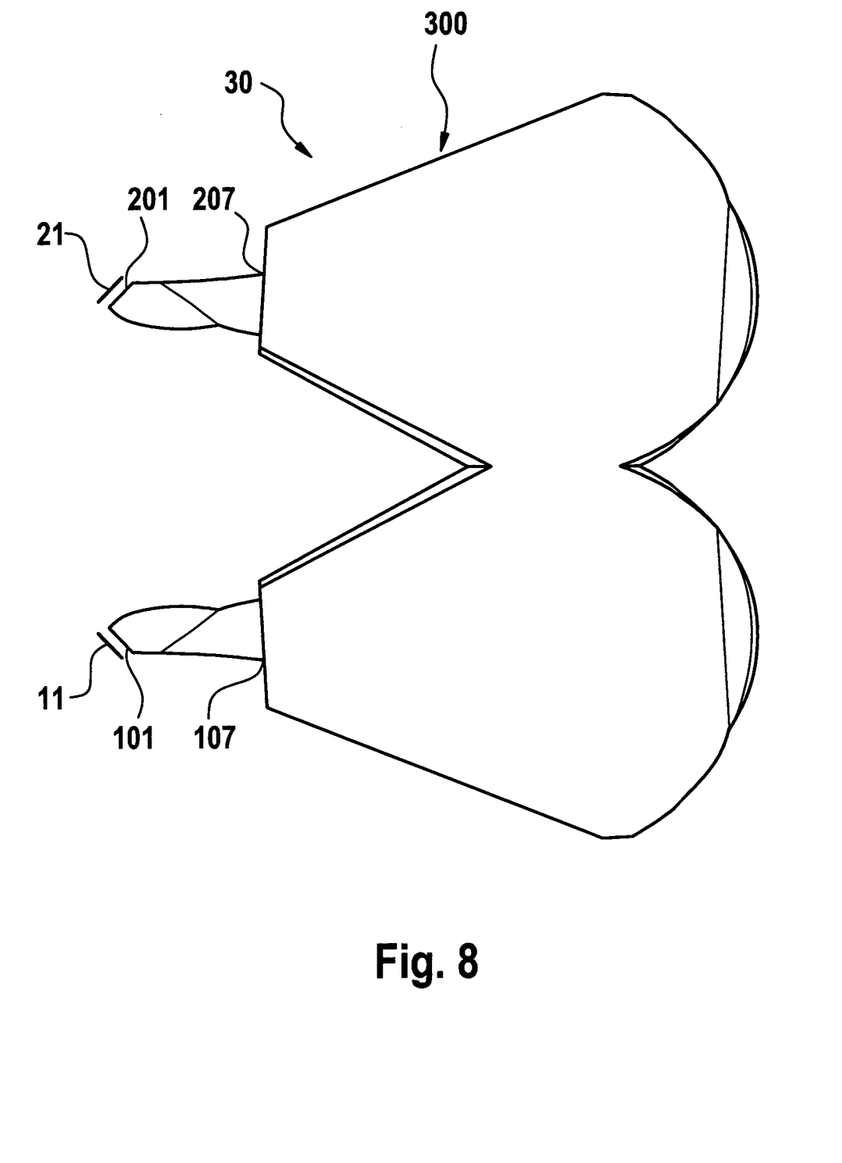
FIG. 8 shows an example of embodiment of a motor vehicle headlight for alternative implementation in the motor vehicle according to FIG. 1.

FIG. 8 shows a modification of the motor vehicle headlight 10 designated by reference numeral 30, wherein same reference numerals as used in FIG. 2 and FIG. 3 specify same or similar elements. Herein, the headlight lenses 100 and 200 are substituted by a headlight lens 300, which, essentially, represents a monolithic implementation of the headlight lenses 100 and 200. The functionality of the motor vehicle headlight 30 corresponds to the functionality of the motor vehicle headlight 10.

In the Figures, the elements, the spacings, distances and gaps, respectively, and the angles are plotted in consideration of simplicity and clearness, and they are not necessarily drawn to scale. Thus, for example, the orders of magnitude of some of the elements, the spacings, distances and gaps, respectively, and the angles are exaggerated with respect to other elements, spacings, distances and gaps, respectively, and angles in order to enhance comprehension of the examples of embodiment of the present invention.

The invention claimed is:

1. A vehicle headlight, the vehicle headlight comprising:
  a first light source,
  at least one second light source,
  a first headlight lens comprising a first body of transparent material, the first body of transparent material comprising:
    a first light tunnel comprising at least one first light entry face, and
    a first light passage section including at least one first optically effective light exit face, wherein the first light tunnel, via a first bend, forms transition into the first light passage section for imaging the first bend as a bright-dark boundary by means of light irradiated from the first light source into the first light entry face, and
  at least one second headlight lens comprising a second body of transparent material, the second body of transparent material comprising:
    at least one second light tunnel comprising at least one second light entry face, and
    a second light passage section including at least one second optically effective light exit face, wherein the second light tunnel, via a second bend, forms transition into the second light passage section for imaging the second bend by means of light irradiated from the second light source into the second light entry face,
  wherein the second bend is essentially configured as a mirror image variant of the first bend, and
  wherein the vehicle headlight is configured such that, a low-beam headlight is implemented by means of the first light source being switched on and a high-beam headlight is implemented by means of the first light source and the second light source being switched on.

2. The headlight lens as claimed in claim 1, the first bend being a curved transition having a radius of curvature of no less than 50 nm and no more than 0.25 mm.

3. The headlight lens as claimed in claim 2, the second bend being a curved transition having a radius of curvature of no less than 50 nm and no more than 0.25 mm.

4. The headlight lens as claimed in claim 1, the first bend being a curved transition having a radius of curvature of at least 0.05 mm.

5. The headlight lens as claimed in claim 4, the second bend being a curved transition having a radius of curvature of at least 0.05 mm.

6. The headlight lens as claimed in claim 1, the first light exit face being segmented.

7. The headlight lens as claimed in claim 6, the second light exit face being segmented.

8. The headlight lens as claimed in claim 1 being configured such that light made to enter the second light tunnel via the second light entry face is directed onto an area above the bright-dark boundary.

9. A vehicle headlight, the vehicle headlight comprising:
  a first light source,
  at least one second light source,
  a headlight lens comprising a monolithic body of transparent material, the monolithic body of transparent material comprising:
    a first light tunnel comprising at least one first light entry face,
    a light passage section including a first optically effective light exit face and at least one second optically effective light exit face, wherein the first light tunnel, via a first bend, forms transition into the first light passage section for imaging the first bend as a bright-dark boundary by means of light irradiated from the first light source into the first light entry face, and
    a second light tunnel, which comprises at least one second light entry face and, via a second bend, forms transition into the light passage section for imaging the second bend by means of light from the second light source irradiated into the second light entry face, and wherein the second bend is essentially configured as a mirror image variant of the first bend, and wherein the vehicle headlight is configured such that, a low-beam headlight is implemented by means of the first light source being switched on and a high-beam headlight is implemented by means of the first light source and the second light source being switched on.

10. The headlight lens as claimed in claim 9, the first bend being a curved transition having a radius of curvature of no less than 50 nm and no more than 0.25 mm.

11. The headlight lens as claimed in claim 10, the second bend being a curved transition having a radius of curvature of no less than 50 nm and no more than 0.25 mm.

12. The headlight lens as claimed in claim 9, the first light exit face being segmented.

13. The headlight lens as claimed in claim 12, the second light exit face being segmented.

14. The headlight lens as claimed in claim 9 being configured such that light made to enter the second light tunnel via the second light entry face is directed onto an area above the bright-dark boundary.

15. A vehicle headlight, the vehicle headlight comprising:
a first light source,
at least one second light source,
a headlight lens comprising a body of transparent material, the body of transparent material comprising:
a first light tunnel comprising at least one first light entry face,
a light passage section including a first optically effective light exit face and at least one second optically effective light exit face, wherein the first light tunnel, via a first bend, forms transition into the first light passage section for imaging the first bend as a bright-dark boundary by means of light irradiated from the first light source into the first light entry face, and
a second light tunnel, which comprises at least one second light entry face and, via a second bend, forms transition into the light passage section for imaging the second bend by means of light from the second light source irradiated into the second light entry face, wherein the second bend is essentially configured as a mirror image variant of the first bend, and wherein the transparent body is configured that
light entering the transparent body through the first light entry face and entering the passage section from the first light tunnel in the region of the first bend exits from the first light exit face an angle of between −30° and 30° with respect to an optical axis, and
light entering the transparent body through the second light entry face and entering the passage section from the second light tunnel in the region of the second bend exits from the second light exit face an angle of between −30° and 30° with respect to the optical axis,
wherein the vehicle headlight is configured such that, a low-beam headlight is implemented by means of the first light source being switched on and a high-beam headlight is implemented by means of the first light source and the second light source being switched on.

16. The headlight lens as claimed in claim 15, the first bend being a curved transition having a radius of curvature of no less than 50 nm and no more than 0.25 mm.

17. The headlight lens as claimed in claim 16, the second bend being a curved transition having a radius of curvature of no less than 50 nm and no more than 0.25 mm.

18. The headlight lens as claimed in claim 17, the first light exit face being segmented.

19. The headlight lens as claimed in claim 18, the second light exit face being segmented.

20. The headlight lens as claimed in claim 15 being configured such that light made to enter the second light tunnel via the second light entry face is directed onto an area above the bright-dark boundary.

* * * * *